United States Patent
Yip et al.

(10) Patent No.: US 7,050,264 B2
(45) Date of Patent: May 23, 2006

(54) LINEAR MAGNETIC TAPE HEAD WITH TAPE CONTACT AREA PROJECTED MINIMAL HEIGHT ABOVE NON-ROTATING CONTOURED HEAD SURFACE

(75) Inventors: Yung Yip, Afton, MN (US); Saeed A. Fahimi, Bloomington, MN (US)

(73) Assignee: Imation Corp., Oakdale, MN (US)

( * ) Notice: Subject to any disclaimer, the term of this patent is extended or adjusted under 35 U.S.C. 154(b) by 80 days.

(21) Appl. No.: 10/295,805

(22) Filed: Nov. 15, 2002

(65) Prior Publication Data
US 2004/0095674 A1    May 20, 2004

(51) Int. Cl.
G11B 5/187  (2006.01)
G11B 5/265  (2006.01)
G11B 5/29   (2006.01)

(52) U.S. Cl. ...................... 360/122; 360/121
(58) Field of Classification Search ................ 360/122, 360/121
See application file for complete search history.

(56) References Cited

U.S. PATENT DOCUMENTS

| | | | | |
|---|---|---|---|---|
| 2,736,775 A | * | 2/1956 | Camras | 360/121 |
| 3,170,045 A | * | 2/1965 | Baumeister et al. | 360/122 |
| 3,526,885 A | * | 9/1970 | Anderson et al. | 360/122 |
| 3,806,902 A | * | 4/1974 | Drees et al. | 360/121 |
| 3,947,887 A | * | 3/1976 | Platter | 360/122 |
| 4,193,103 A | * | 3/1980 | Fesler et al. | 360/122 |
| 4,322,764 A | * | 3/1982 | Tanaka | 360/121 |
| 4,589,043 A | * | 5/1986 | Grundtner | 360/121 |
| 4,695,909 A | * | 9/1987 | Momata et al. | 360/121 |
| 4,797,767 A | * | 1/1989 | Baus, Jr. | 360/121 |
| 4,809,110 A | * | 2/1989 | Hertrich | 360/121 |
| 4,949,208 A | * | 8/1990 | Milo et al. | 360/122 |
| 5,063,469 A | * | 11/1991 | Tandai | 360/122 |
| 5,602,703 A | * | 2/1997 | Moore et al. | 360/121 |
| 5,781,383 A | * | 7/1998 | Strand | 360/122 |
| 5,969,912 A | * | 10/1999 | Cope | 360/122 |

* cited by examiner

Primary Examiner—Craig A. Renner
(74) Attorney, Agent, or Firm—Eric D. Levinson

(57) ABSTRACT

The invention is directed to a non-rotating head used in linear scanning of linear magnetic tape. For example, the head may include a non-rotating contoured surface shaped to facilitate flyability of linear magnetic tape passing over the non-rotating contoured surface. A contact area defining a magnetic gap may protrude from the surface. The contact area that projects from the surface can contact the magnetic tape to read data from the tape and/or write data to the tape as the tape flies over the surface.

21 Claims, 8 Drawing Sheets

LINEAR MAGNETIC TAPE HEAD WITH TAPE CONTACT AREA PROJECTED MINIMAL HEIGHT ABOVE NON-ROTATING CONTOURED HEAD SURFACE

TECHNICAL FIELD

The invention relates to magnetic recording and, in particular, linear scanning of linear magnetic tape.

BACKGROUND

Magnetic tape is often used for storage and retrieval of data, and comes in many widths, lengths and formats. Magnetic tape remains an economical medium for storing large amounts of data. For example, magnetic tape cartridges or spools of magnetic tape are often used to back up large amounts of data for computing centers and the like. Magnetic tape cartridges also find application in the backup of data stored on smaller computers such as workstations, desktop computers and laptop computers. In addition, magnetic tape is commonly used in video recording, including both analog and digital video recording.

Video recording on magnetic tape typically uses helical scanning, in which the magnetic tape is fed past a rotating drum. The rotating drum includes one or more contact areas that protrude from the drum to contact the magnetic tape. The contact areas define magnetic gaps that facilitate data recording on the magnetic tape and the reading of data stored on the magnetic tape. The motion of the magnetic gap(s) on the rotating drum are typically much faster than the lateral movement of the magnetic tape past the drum. For example, the motion of the magnetic gaps on the drum may be in the range of approximately 1–20 meters per second, whereas the motion of the magnetic tape past the drum may be in the range of approximately 1–20 centimeters per second.

In helical scanning, such as that used in video recording, the rotating drum rotates at an offset angle relative to motion of the tape, which causes helical data tracks to be formed on the magnetic tape as the tape passes by the rotating drum. Moreover, the rotating drum creates an air interface between the tape and the drum in the regions of the drum that do not correspond to the contact area(s). Thus, the tape essentially "flies" relative to the rotating drum, and is contacted only by the contact areas(s) that protrude from the drum.

Linear scanning refers to techniques in which linear tape is fed past a non-rotating head. In contrast to helical scanning in which a rotating drum includes a protruding contact area defining a magnetic gap, in linear scanning the magnetic gap is positioned at a generally fixed location associated with a non-rotating magnetic head, and the linear tape feeds past the magnetic gap of the non-rotating magnetic head. Accordingly, data tracks on linear tape are typically parallel to the length of the tape. In linear scanning, the magnetic tape typically feeds past a non-rotating head at a tape speed of approximately 1–20 meters per second.

Conventional head designs for linear scanning are generally more aggressive than heads used in helical scanning, particularly in terms of the size of the contact area between the head and the tape. In addition, in linear scanning the linear tape typically does not fly over any structure prior to contact with the linear head. Instead, linear tape is typically fed into direct contact with a relatively large contact area that defines the magnetic head. In addition, sharp corners are often used on conventional linear heads to improve the intimate contact between the magnetic head and the magnetic tape. This aggressive contact design of linear heads, however, generally limits the use of fragile tape media in linear scanning systems.

SUMMARY

In general, the invention is directed to a non-rotating head used in linear scanning of linear magnetic tape. The head may include, for example, a non-rotating contoured surface shaped to facilitate flyability of linear magnetic tape passing over the contoured surface. One or more contact areas, each defining a magnetic gap, may project from the contoured surface. The contact area(s) that project from the surface can contact the magnetic tape to read data from the tape and/or write data to the tape as the tape flies over the surface.

In one embodiment, the invention provides a magnetic head comprising a non-rotating contoured surface shaped to facilitate flyability of linear magnetic tape passing over the surface. The head may also include a contact area defining a magnetic gap, wherein the contact area projects from the surface to contact magnetic tape flying over the surface.

In another embodiment, the invention provides a system comprising a magnetic tape and a magnetic head that scans the tape as the tape passes over the head. The magnetic head may include a non-rotating contoured surface shaped to facilitate flyability of the magnetic tape passing over the surface, and a contact area defining a magnetic gap, wherein the contact area projects from the surface to contact the magnetic tape flying over the surface. The magnetic tape may comprise metal evaporated (ME) tape, metallic tape, sputtered tape, particulate tape, or other magnetic tape media.

In another embodiment, the invention provides a method of creating a magnetic head. The method may include forming a contoured surface that defines a magnetic gap in the contoured surface, and masking an area surrounding the magnetic gap. The method may also include removing material from the contoured surface in non-masked locations. Lapping techniques or other burnishing techniques can then be used to blend and polish the head so that a flyable surface is maintained.

The invention can provide a number of advantages. In particular, the invention can improve magnetic heads used in linear scanning. The invention may also improve the manufacture of such magnetic heads.

The magnetic heads described herein may be particularly useful for fragile magnetic tape such as metal evaporated (ME) tape, particulate tape, metallic tape, sputtered tape, or the like. Such fragile magnetic tape may be damaged by conventional magnetic heads because of aggressive contact between the tape and the head. The invention provides a flyable, minimal contact alternative specifically for linear systems so that fragile magnetic tape can be used in the linear system. Accordingly, to the extent that fragile magnetic tape has improved data storage densities relative to conventional tape used in linear systems, the invention can improve data storage densities in a linear system by facilitating the use of fragile, high density tape in such linear systems.

Additional details of various embodiments are set forth in the accompanying drawings and the description below. Other features, objects, and advantages of the invention will be apparent from the description and drawings, and from the claims.

DETAILED DESCRIPTION

Figure 1:
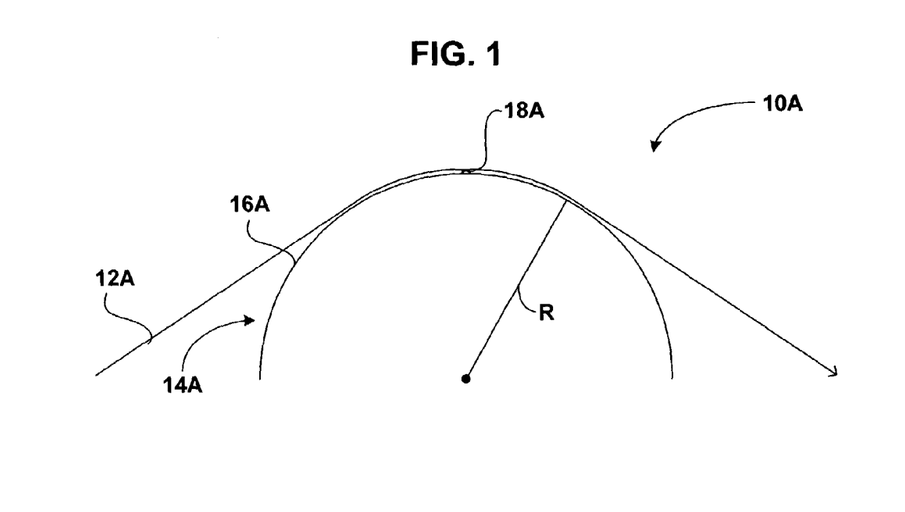
FIG. 1 is a cross-sectional side view of a linear magnetic scanning system according to an embodiment of the invention.
Figure 2:
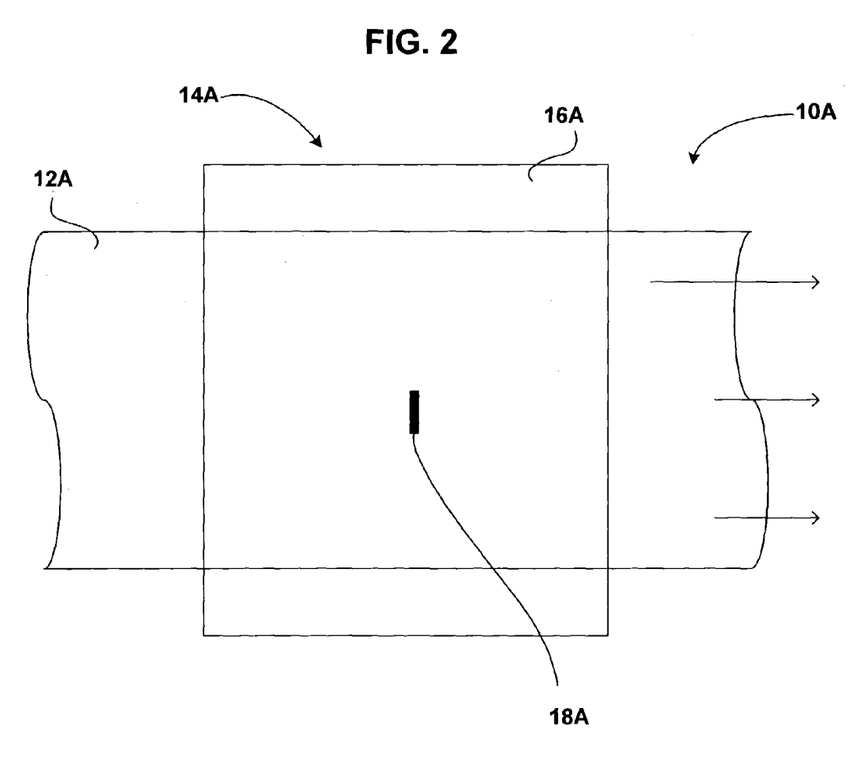
FIG. 2 is a top view of the system illustrated in FIG. 1.

FIG. 1 is a cross-sectional side view of a linear magnetic scanning system 10A in which a magnetic tape 12A flies over a magnetic head 14A. FIG. 2 is a top view of system 10A. Alternatively, FIG. 1 may be viewed as a top view and FIG. 2 may be viewed as a side view. Magnetic head 14A is non-rotating, in contrast to rotating drum heads of helical scanning systems. In other words, system 10A is a linear system in which magnetic tape 12A moves laterally (as indicated by the arrows) relative to a non-rotating magnetic head 14A. Magnetic head 14A, however, may still be movable and positionable relative to tracks on magnetic tape 12A, e.g., in response to servo signals.

Magnetic head 14A includes a non-rotating contoured surface 16A shaped to facilitate flyability of magnetic tape 12A passing over the surface 16A. For example, contoured surface 16A may define a portion of a curved shape, such as a portion of a cylindrical shape. In other words, contoured surface 16A may be semi-cylindrical. The cylindrical contour may be large enough to promote flyability of magnetic tape 12A moving at speeds in the range of approximately 1 to 20 meters per second relative to surface 16A. More specifically, a radius (R) associated with contoured surface 16A may be greater than approximately five millimeters, such as in the range of approximately 5–50 millimeters. The size of radius (R) needed to ensure flyability, however, may depend on the lateral speed of magnetic tape 12A relative to surface 16A, tape tension, tape properties, and possibly other factors. In particular, larger radii may be needed at slower tape speeds in order to ensure that magnetic tape 12A flies over surface 16A. The smoothness of surface 16A may also affect flyability. Accordingly, surface 16A may be polished to further promote flyability.

A contact area 18A defining a magnetic gap may project from surface 16A to contact magnetic tape 12A flying over surface 16A. For example, contact area 18A may protrude from surface 16A to a height less than a fly height, such as less than approximately 10 microns. In that case, if magnetic tape 12A flies over surface 16A at a fly height of less than approximately 10 microns, the protruding contact area 18A can contact magnetic tape 12A as it passes over contact area 18A. Accordingly, a magnetic gap defined in contact area 18A can be used to read and write data to magnetic tape 12A.

Contact area 18A may define a surface area less than approximately one square millimeter, e.g., 1 mm by 1 mm or other non-symmetric shapes. A surface area in this range may ensure minimal contact with tape 12A. Accordingly, fragile media such as metal evaporated (ME) tape, particulate tape, metallic tape, sputtered tape, or the like, can be used as magnetic tape 12A with a substantial reduction of damage or destruction to magnetic tape 12A by magnetic head 14A.

The size of contact area 18A, and particularly the width of contact area 18A, may be dependent on the written track pitch on the tape and the channel pitch of the magnetic head. The channel pitch refers the distance between respective contact areas on the head, e.g., a distance between areas 18D and 18E of FIG. 5. A desirable width of a respective contact area 18 (the dimension perpendicular to tape motion) may correspond to a width slightly wider than a width of the magnetic gap within the respective contact area 18. A desirable length of a respective contact area 18 (the dimension parallel to tape motion) may be affected by several factors including tape stiffness, a range of tape speed, and the radius of the flying surface. In some cases, one or more contact areas 18 may define non-uniform shapes. In any case, an overall surface area of a given contact area being less than one square millimeter can insure minimal head to tape contact.

Referring again to FIGS. 1 and 2, contact area 18A can be contoured to promote such non-destructive contact with magnetic tape 12A. For example, contact area 18A can be contoured with rounded edges. The rounded edges can be formed, e.g., by lapping techniques. In some embodiments, contact area 18A defines two or more changes in height. In that case, each of the changes in height may be rounded to promote non-destructive contact between magnetic tape 12A and contact area 18A. In other cases, contact area 18A may define a linear or substantially non-linear variation in height. In still other embodiments, contoured surface 16A may define a portion of a first cylindrical shape, and contact area 18A may define a portion of a second cylindrical shape. In any case, magnetic head 14A provides a flyable surface with minimal contact area, which allows fragile magnetic tape to be used in a linear system.

Figure 3:
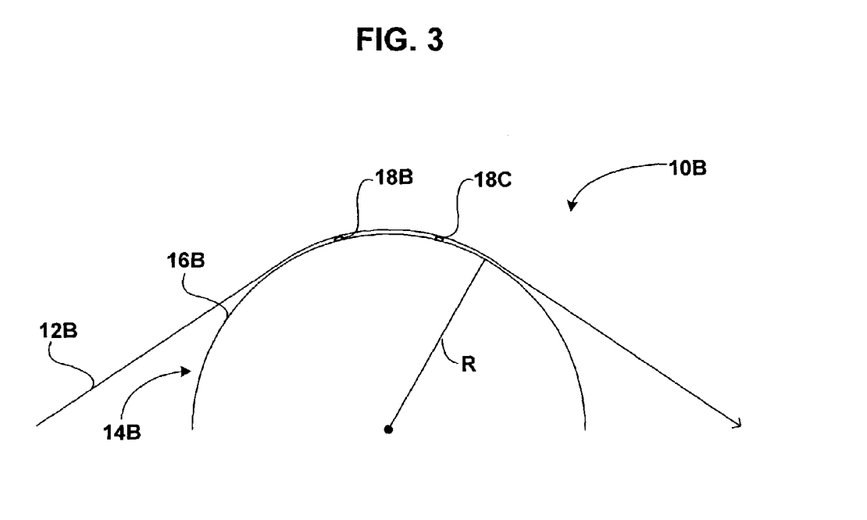
FIG. 3 is another cross-sectional side view of a linear magnetic scanning system according to an embodiment of the invention.
Figure 4:
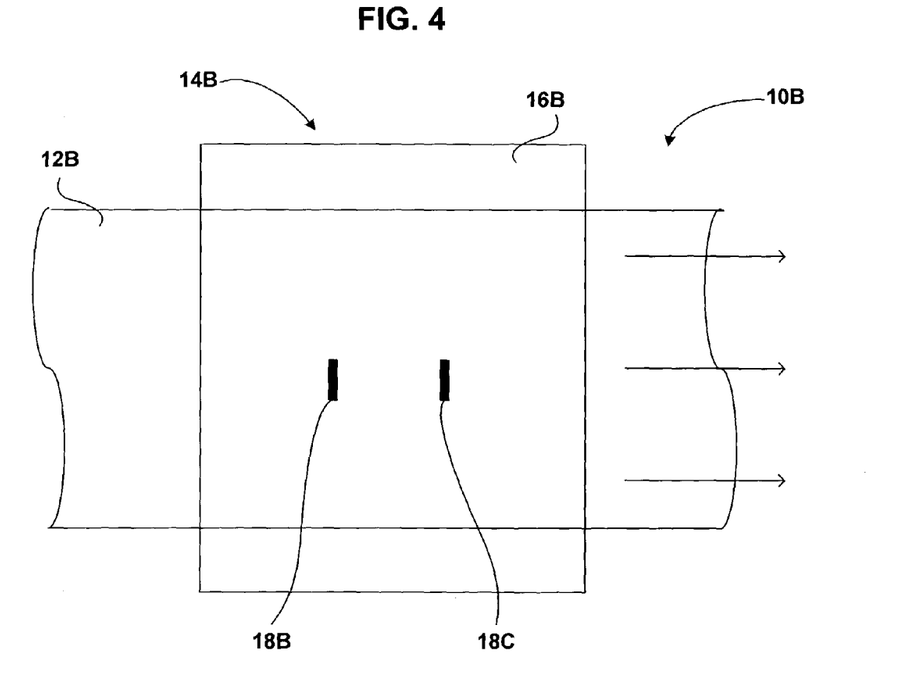
FIG. 4 is a top view of the system illustrated in FIG. 3.

FIG. 3 is another cross-sectional side view of a linear magnetic scanning system 10B in which a magnetic tape 12B flies over a magnetic head 14B. FIG. 4 is a top view of system 10B. As illustrated, magnetic head 14B of system 10B includes two contact areas 18B, 18C. In accordance with the invention, any number of contact areas may be formed on contoured surface 16B. In any case, a non-rotating contoured flyable surface 16B allows magnetic tape 12B to fly over magnetic head 14B such that contact between the magnetic tape 12B and magnetic head 14B occurs only at the relatively small contact areas 18B, 18C.

Like system 10A illustrated in FIGS. 1 and 2, system 10B illustrated in FIGS. 3 and 4 includes a contoured surface 16B that follows a cylindrical shape large enough to promote flyability of magnetic tape 12B moving at speeds in the range of 1 to 20 meters per second relative to surface 16B. A radius (R) associated with contoured surface 16B may be greater than approximately five millimeters, such as in the range of approximately 5–50 millimeters. Surface 16B may be polished to further promote flyability.

Contact areas 18B, 18C, each defining a magnetic gap, may project from surface 16B to a height less than a fly height, such as less than approximately 10 microns. In that case, if magnetic tape 12B flies over surface 16B at a fly height of less than approximately 10 microns, the protruding contact areas 18B, 18C can contact the tape as the tape passes over contact areas 18B, 18C. These contact areas 18B, 18C each may define a surface area less than approximately one square millimeter in order to ensure minimal contact with tape 12B. Accordingly, fragile media such as metal evaporated (ME) tape, particulate tape, metallic tape, sputtered tape, or the like, can be used as magnetic tape 12B without being damaged or destroyed by magnetic head 14B. Moreover, contact areas 18B, 18C themselves can be cylindrically contoured to promote non-destructive contact with magnetic tape 12B.

Figure 5:
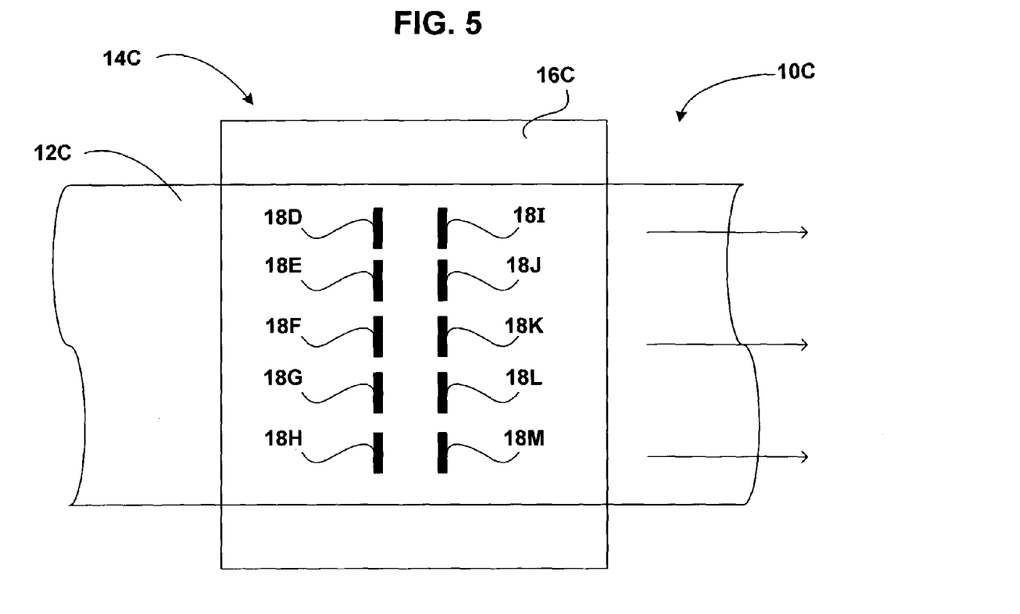
FIGS. 5 and 6 are top views of linear magnetic scanning systems according to embodiments of the invention.
Figure 6:
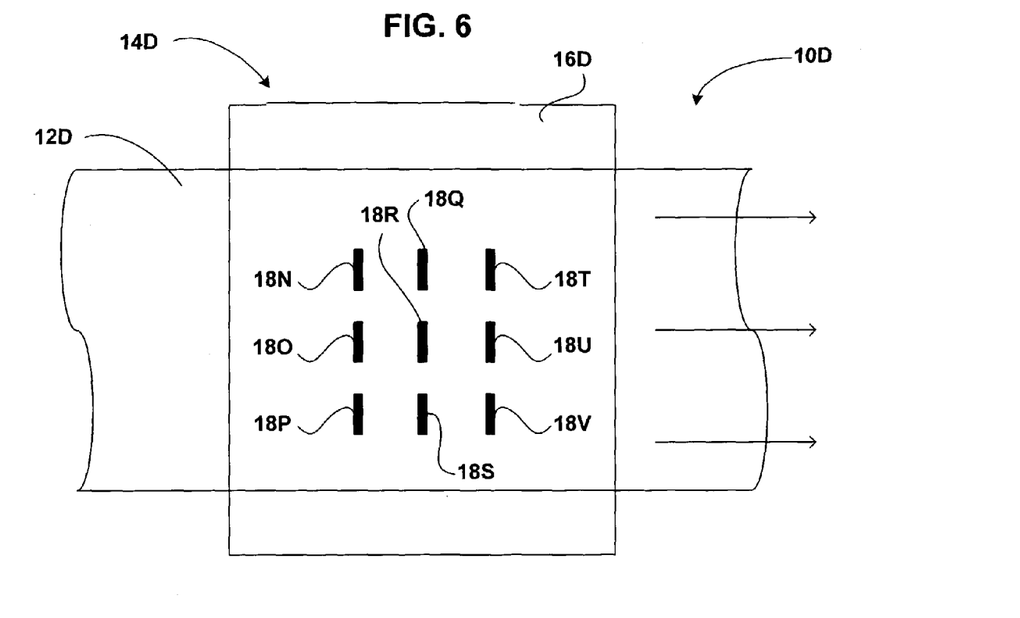

FIGS. 5 and 6 are top views of systems 10G and 10D in accordance with additional embodiments. As mentioned, any number of contact areas may be formed on the respective contoured surface of the magnetic head. As illustrated in FIG. 5, ten contact areas 18D–18M are defined on contoured surface 16C of magnetic head 14C, and as illustrated in FIG. 6, nine contact areas 18N–18V are defined on contoured surface 16D of magnetic head 14D. Each respective contact area 18 defines a magnetic gap. Contact areas may be arranged sequentially such that, for example, a first contact area 18D is positioned to contact a first track of the magnetic tape 12C at a first instance, and a second contact area 18I is positioned to contact the same location of the first track of magnetic tape 12C at a second instance. In that case, contact area 18D may define a write gap and contact area 18I may define read gap for verifying data written by the write gap. Similarly, as illustrated in FIG. 6, three or more contact areas 18N–18P may be arranged sequentially on magnetic head 14D to contact a common track of magnetic tape 12D.

Contact areas 18 may also be arranged in parallel such that, for example, a first contact area 18D is positioned to contact a first track of magnetic tape 12C and a second contact area 18E is positioned to contact a second track of magnetic tape 12C at substantially the same instance. In this manner, increased amounts of data can be written to or read from magnetic tape 12C in a given amount of time.

Figure 7:
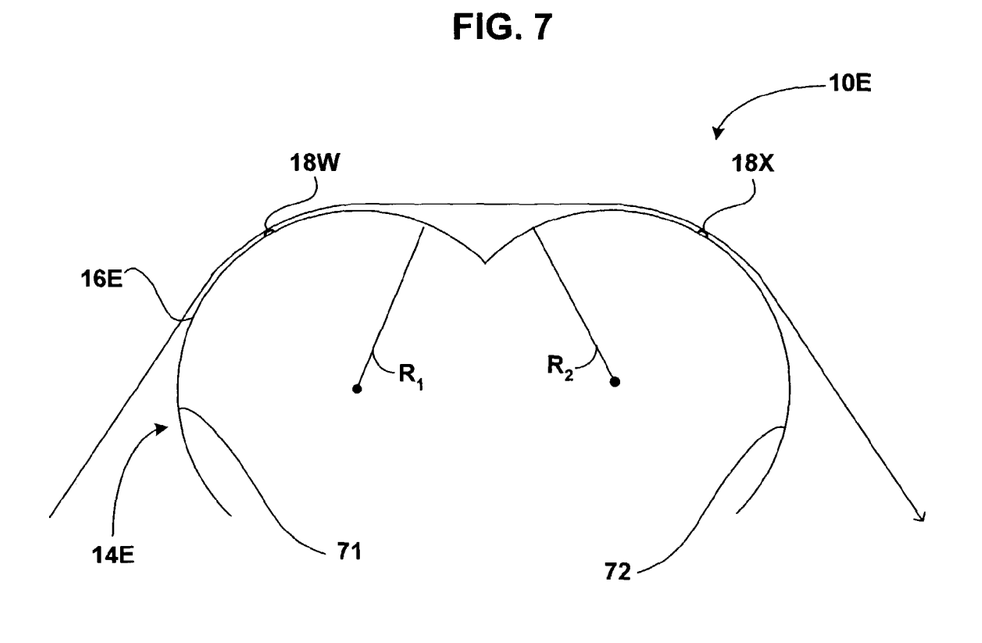
FIG. 7 is another cross-sectional side view of a linear magnetic scanning system according to an embodiment of the invention.

FIG. 7 is a cross-sectional side view of system 10E in accordance with an additional embodiment of the invention. System 10E may include many of the features outlined above. In addition, in system 10E the non-rotating contoured surface 16E of magnetic head 14E defines a portion of at least two distinct cylindrical shapes. In other words, magnetic head 14E may comprise two or more semi-cylindrical shapes 71, 72. The radii ($R_1$ and $R_2$) may be substantially the same, or different. In any case, contoured surface 16E is a flyable surface and contact areas 18W, 18X protrude from the flyable surface to contact magnetic tape 10E. One or more contact areas can be formed on each respective semi-cylindrical shape 71, 72 of contoured surface 16E. In other cases, the magnetic head may define three or more semi-cylindrical shapes that include contact areas as described herein.

The magnetic heads described herein may be particularly useful for linear scanning of fragile magnetic tape such as metal evaporated (ME) tape, particulate tape, metallic tape, sputtered tape, or the like. Such fragile magnetic tape may be damaged or destroyed by conventional linear magnetic heads because of aggressive contact between the tape and the head. The invention provides a flyable, minimal contact alternative, specifically for linear systems so that fragile magnetic tape can be used in the linear system. Accordingly, to the extent that fragile magnetic tape has improved data storage densities relative to conventional tape used in linear systems, the invention can improve data storage densities in a linear system by facilitating the use of fragile, high density tape in such linear systems. In other embodiments, however, the linear head described herein may be used with conventional non-fragile magnetic tape media. For example, even with non-fragile media, the invention may provide advantages of reduced tape wear.

Figure 8:
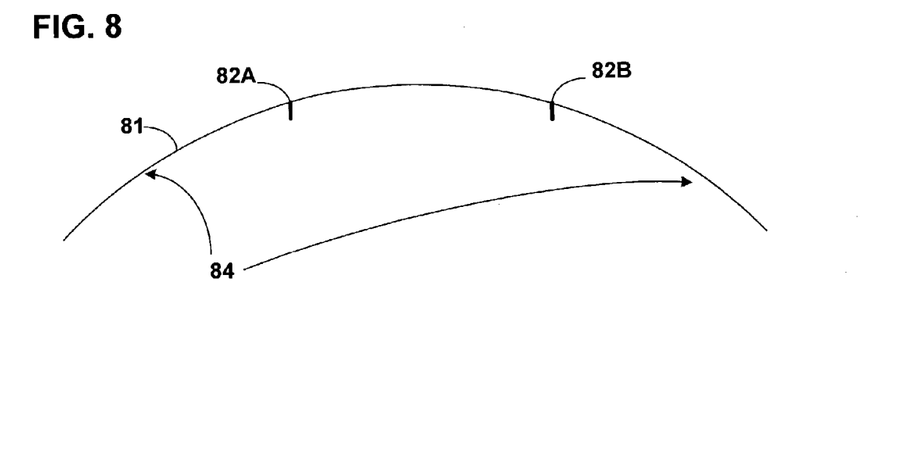
FIGS. 8–17 are cross-sectional side views illustrating the creation of magnetic heads in accordance with embodiments of the invention.

FIGS. 8–17 are cross-sectional side views illustrating the creation of magnetic heads in accordance with embodiments of the invention. Originally, a contoured surface 81 is formed to define one or more magnetic gaps 82A, 82B (collectively gaps 82) as illustrated in FIG. 8. For example, gaps 82 may be formed of magnetic rings electrically coupled to current sources. These rings can be embedded in a material which is shaped to define contoured surface 81. For example, the material in which the rings are embedded may comprise ceramic, metal, glass or ferrite. More specifically, the material may include aluminum oxide, AlTiC, barium or calcium titanate, NiZn ferrite, MnZn ferrite, or other materials. In any case, this initial process may be similar to conventional head creation in which one or more magnetic rings are embedded in material to define a contact surface. In conventional linear head construction, however, material is sawed from the edges 84 to form slots which skive air, and in turn allow the tape to come into intimate contact with the head. In this case, removal of material from edges 84 is generally avoided.

Figure 9:
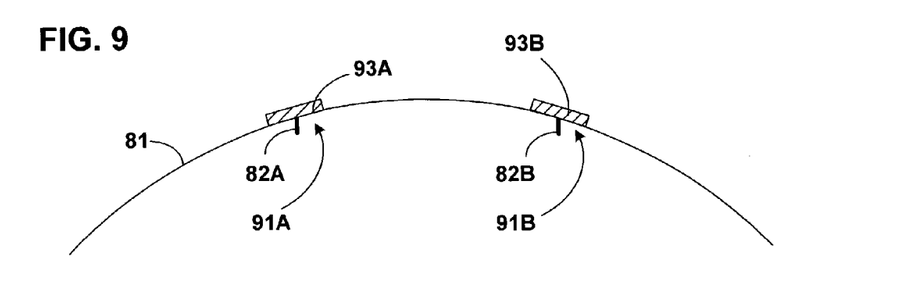

Instead, in accordance with an embodiment of the invention, areas 91A, 91B surrounding gaps 82 are masked with masking material 93A, 93B as shown in FIG. 9. The type of masking material used may depend on the subsequent etching process that is used to remove material in non-masked locations. As one example, masking material 93 may comprise a photoresist. The size of the masks may correspond approximately to the desired size of contact areas being created.

Figure 10:
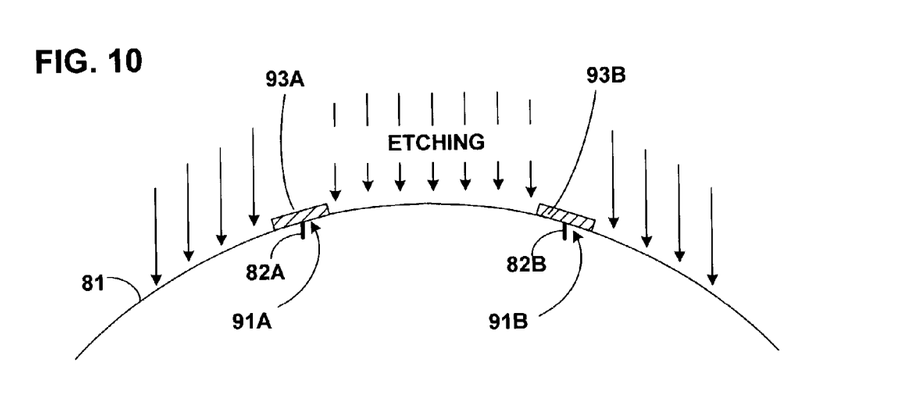
Figure 11:
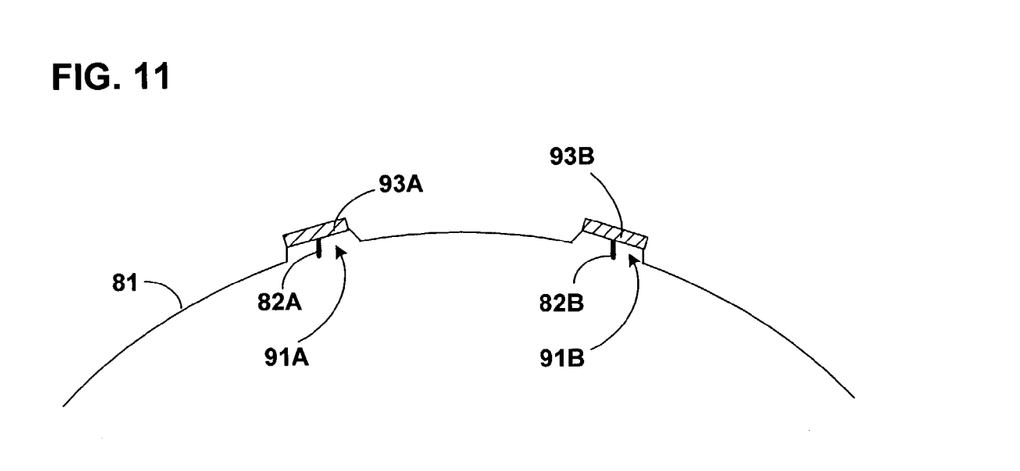

After masking the areas 91 surrounding gaps 82, material is removed from the contoured surface 81 in non-masked locations. For example, a chemical etching process, ion etching process, or the like may be applied, as illustrated in FIG. 10 to remove material form the non-masked locations of contoured surface 81. Other processes that may be used to etch material may include laser cutting, mechanical machining or grinding. The result of this etching process is illustrated in FIG. 11. Etching may be performed to an extent sufficient to remove less than approximately 10 microns of material in all the non-masked locations. In other words, the desired height of contact areas being created may correspond substantially to the thickness of material that is removed in the non-masked areas of surface 81.

Figure 12:
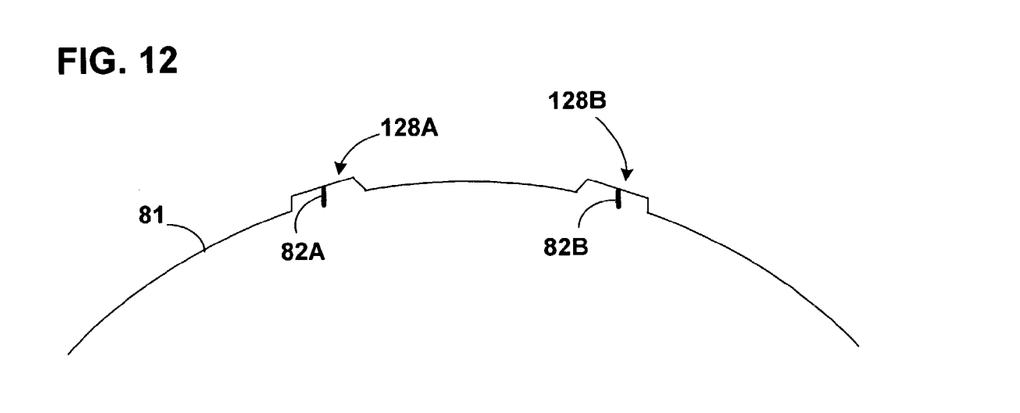
Figure 13:
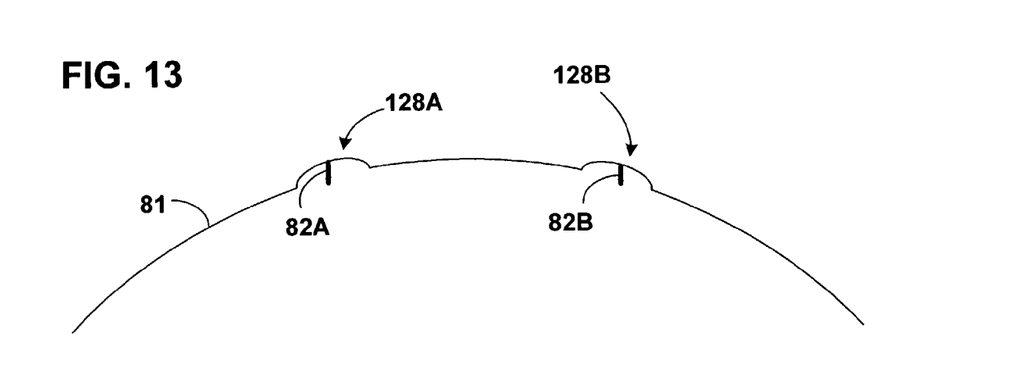

Masking material 93 can then be removed, as illustrated in FIG. 12, so that contact areas 128A, 128B are exposed. In that case, contact areas 128 may have a surface area approximately corresponding to the size of the masks, and a height that corresponds to the thickness of material removed from surface 81 in the non-masked locations. The surface can then be lapped or burnished to blend corners of contact areas 128 so that the corners are rounded as illustrated in FIG. 13. Lapping or other burnishing techniques may also be used to polish surface 81 to improve the flyability of magnetic tape that will pass over surface 81. In this manner, a magnetic head can be created to include protruding contact areas 128 sized with a sufficiently small surface area. The contact areas 128 may also project from surface 81 to a height that is sufficiently small. Moreover, the contact areas 128 define magnetic gaps 82 that can be used for magnetically reading and writing data on linear magnetic tape as the tape flies over surface 81 and is contacted only by the contact areas 128.

Figure 14:
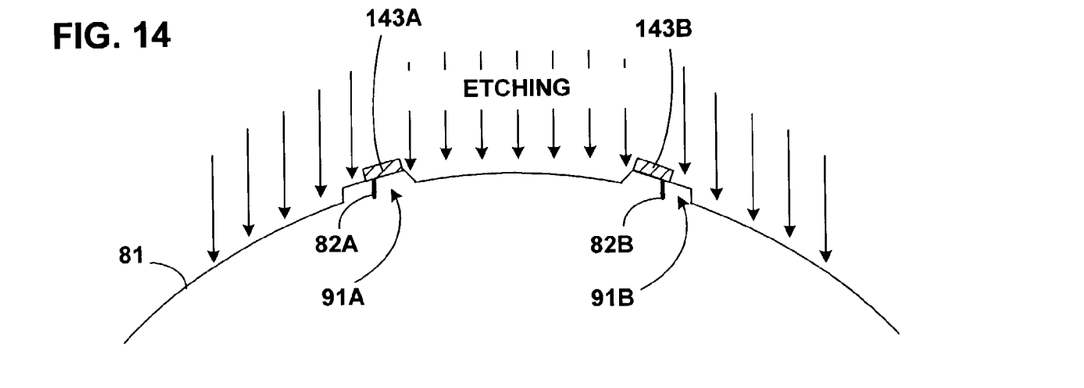
Figure 15:
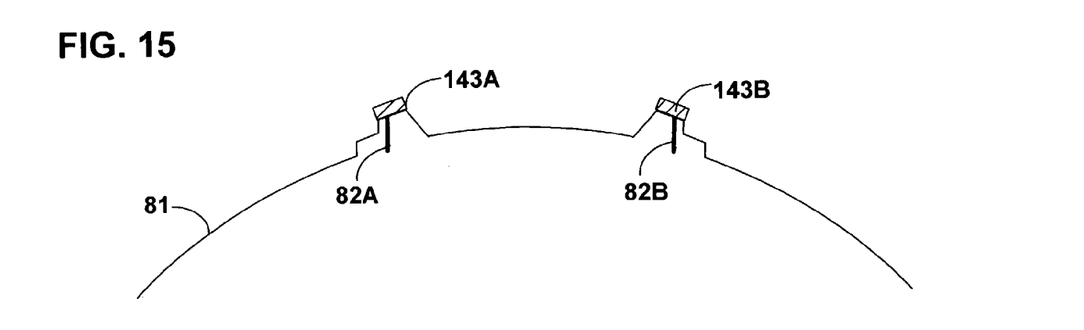
Figure 16:
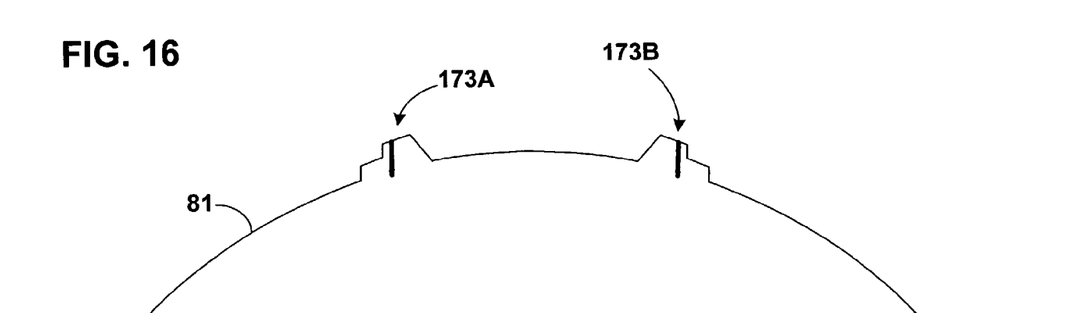
Figure 17:
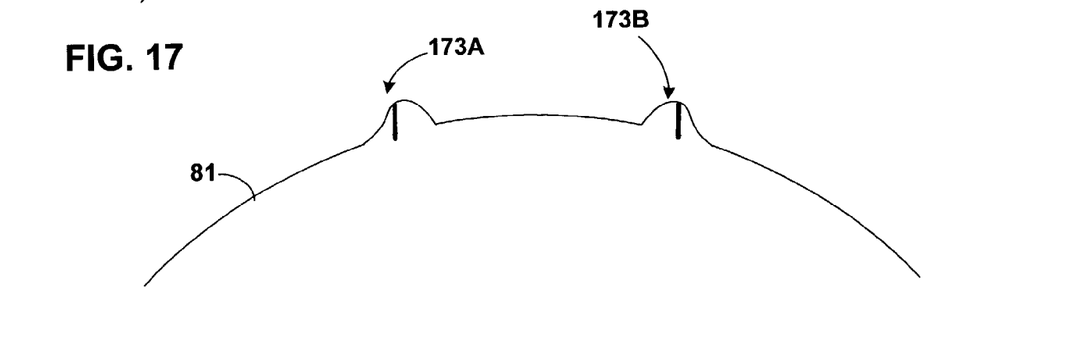

FIGS. 14–17 illustrate additional processing that may be performed to further define the shape of contact areas. For example, after removing masking material 93 as illustrated in FIG. 12, another masking material 143A and 143B (collectively 143) can be applied to a subset of the surface area associated with areas 91 surrounding gaps 82, as shown in FIG. 14. Additional etching may be performed on non-masked regions of surface 81 to create a structure that appears similar to that illustrated in FIG. 15. The masking material 143 can then be removed as illustrated in FIG. 16 to expose contact areas 173A, 173B, and lapping or other burnishing techniques can be used to blend contact areas 173 and polish surface 81 as illustrated in FIG. 17. In this manner, more complex contours can be formed on contact areas 173 to further promote non-destructive contact between contact areas 173 and a magnetic tape flying over surface 81. For example, contact areas 173 may define linear or non-linear height variations that promote such non-destructive contact with magnetic tape flying over surface 81. Two or more changes in height may also improve systems that operate bi-directionally, i.e., when the tape moves over the head in either direction.

Figure 18:
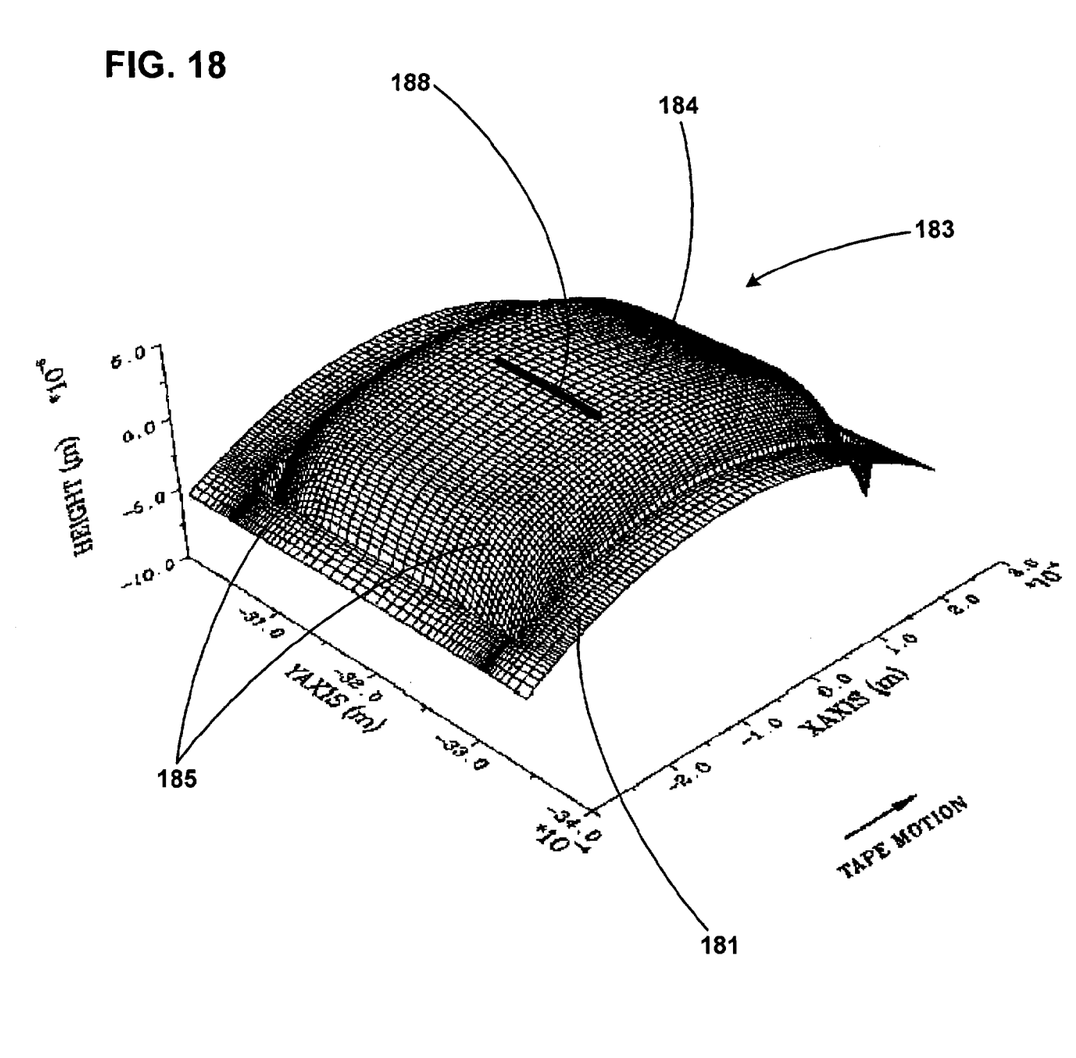
FIG. 18 is a three-dimensional illustration of a contact area formed on a contoured surface in accordance with an embodiment of the invention.

FIG. 18 is a three-dimensional illustration of a contact area formed on a contoured surface in accordance with an embodiment of the invention. The illustrated grid lines define the contour of a continuous contact area 183 relative to a continuous surface 181. In this case, contact area 183 defines a top surface 184 that substantially follows a semi-cylindrical shape. Contact area 183 also defines rounded edges 185 that promote non-destructive contact with magnetic tape flying over surface 181. Surface 181 substantially follows a semi-cylindrical shape. Moreover, the semi-cylindrical shape of surface 181 may be similar to the semi-cylindrical shape of top surface 184 of contact area 183, but offset by less than 10 microns, which corresponds to the distance that contact area 183 protrudes from surface 181. In any event, contact area 183 defines a magnetic gap 188 used for reading data from a magnetic tape, or recording data onto a magnetic tape that flies over surface 181. The minimal size of contact area 183, the relatively small projecting height of contact area, and the non-destructive shape of contact area 183 may all contribute to ensuring that fragile magnetic tape can be used in the linear system without being destroyed.

A number of embodiments of the invention have been described. For example, a non-rotating head used in linear scanning of linear magnetic tape has been described. Nevertheless, various modifications may be made without departing from the scope of the invention. For example, the contact areas may assume a wide variety of shapes and sizes, and may project from the respective flyable surface to various different heights. The most desirable height may depend on the speed associated with the magnetic tape relative to the surface of the magnetic head, as well as other variables such as tension, thickness and stiffness associated with the magnetic tape. The contoured surface may also be modified slightly to accommodate different tape speeds, or the like.

In some cases, the system may be rotated relative to the illustrations provided herein. For example, described top views may be side views, and the side views may be top views of similar implementations of the invention in which the magnetic tape feeds past the head in an orientation that is perpendicular to the ground. Also, as another possible alternative for head creation in accordance with the invention, sputtering may be used to add material thickness to contact areas, rather than removing material in non-masked locations as described above. These and other embodiments are within the scope of the following claims.

The invention claimed is:

1. A magnetic head comprising:
   a non-rotating contoured surface shaped to facilitate flyability of a linear magnetic tape passing over the non-rotating contoured surface; and
   a contact area defining a magnetic gap, wherein the contact area projects from the non-rotating contoured surface to a height less than approximately 10 microns to contact the linear magnetic tape flying over the non-rotating contoured surface.

2. The magnetic head of claim 1, wherein the non-rotating contoured surface defines a portion of a curved shape.

3. The magnetic head of claim 2, wherein the curved shape is a cylindrical shape.

4. The magnetic head of claim 3, wherein a radius of the cylindrical shape is sufficiently large to promote flyability of the linear magnetic tape moving at speeds in a range of approximately 1 to 20 meters per second relative to the non-rotating contoured surface.

5. The magnetic head of claim 4, wherein the radius is greater than approximately five millimeters.

6. The magnetic head of claim 1, wherein the non-rotating contoured surface is polished to promote flyability of the linear magnetic tape passing over the non-rotating contoured surface.

7. The magnetic head of claim 1, wherein the contact area defines a surface area less than approximately one square millimeter.

8. The magnetic head of claim 1, wherein the contact area is contoured to promote non-destructive contact between the linear magnetic tape and the contact area.

9. The magnetic head of claim 8, wherein the contact area is contoured with rounded edges.

10. The magnetic head of claim 8, wherein the contact area defines two or more changes in height, wherein each of the changes in height are rounded to promote non-destructive contact between the linear magnetic tape and the contact area.

11. The magnetic head of claim 8, wherein the contact area defines a substantially non-linear variation in height over at least a portion of the contact area.

12. The magnetic head of claim 1, wherein the contact area defines a substantially linear variation in height over at least a portion of the contact area.

13. The magnetic head of claim 1, further comprising a plurality of contact areas, each defining at least one magnetic gap, wherein the contact areas project from the non-rotating contoured surface to contact the linear magnetic tape flying over the non-rotating contoured surface.

14. The magnetic head of claim 13, wherein a first contact area is positioned to contact a first track of the linear magnetic tape and a second contact area is positioned to contact a second track of the linear magnetic tape.

15. The magnetic head of claim 13, wherein a first contact area is positioned to contact a location of a first track of the linear magnetic tape at a first instance, and a second contact area is positioned to contact the location of the first track of the linear magnetic tape at a second instance.

16. The magnetic head of claim 1, wherein the non-rotating contoured surface defines a portion of a first cylindrical shape, and the contact area defines a portion of a second cylindrical shape.

17. The magnetic head of claim 1, wherein the non-rotating contoured surface defines a portion of at least two separate cylindrical shapes.

18. A system comprising:
a magnetic tape; and
a magnetic head including a non-rotating contoured surface shaped to facilitate flyability of the magnetic tape passing over the non-rotating contoured surface and a contact area defining a magnetic gap, wherein the contact area projects from the non-rotating contoured surface to a height less than approximately 10 microns to contact the magnetic tape flying over the non-rotating contoured surface.

19. The system of claim 18, wherein the non-rotating contoured surface defines a portion of a cylindrical shape, wherein a radius of the cylindrical shape is large enough to promote flyability of the magnetic tape moving at speeds in the range of approximately 1 to 20 meters per second relative to the non-rotating contoured surface.

20. The system of claim 18, wherein the contact area defines a surface area less than approximately one square millimeter.

21. The system of claim 18, wherein the magnetic tape comprises tape selected from the group consisting of: metal evaporated (ME) tape, metallic tape, sputtered tape and particulate tape.

* * * * *